3,641,108
PROPARGYL ESTERS OF BICYCLO[2.2.1]HEPT-5-ENE-2-CARBOXYLIC ACID AND BICYCLO[2.2.1]HEPTANE-2-CARBOXYLIC ACID

Robert L. Roudabush and Linwood E. Drummond, Rochester, N.Y., assignors to Eastman Kodak Company, Rochester, N.Y.
No Drawing. Filed June 26, 1969, Ser. No. 836,955
Int. Cl. C07c 69/74
U.S. Cl. 260—468 B
9 Claims

ABSTRACT OF THE DISCLOSURE

Propargyl esters of bicyclo[2.2.1]hept-5-ene-2-carboxylic acid or bicyclo[2.2.1]heptane-2-carboxylic acid are obtained by esterification of the acid with propargyl alcohol. The esters are useful as bactericides and fungicides.

DISCLOSURE

The present invention relates to novel derivatives of bicyclo[2.2.1]hept-5-ene and bicyclo[2.2.1]heptane. More particularly, this invention relates to propargyl esters of bicyclo[2.2.1]hept-5-ene-2-carboxylic acid and bicyclo[2.2.1]heptane-2-carboxylic acid.

The compounds of this invention may be represented by the formula:

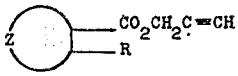

wherein R is hydrogen or alkyl and Z is a 1,3-cyclopentylene or 1,3-cyclopent-4-enylene group having no substituents other than lower alkyl, there being no more than 5, and preferably no more than 1, of such substituents if any is present. By the term lower alkyl is meant linear or branched chain alkyl of up to about 4 carbons, such as methyl, ethyl, isopropyl, tert-butyl and the like, with methyl being preferred.

The compounds of this invention are prepared from cyclopentadiene or alkyl derivatives thereof and α,β-unsaturated carboxylic acids to produce a bicyclo[2.2.1]hept-5-ene-2-carboxylic acid, which may be hydrogenated in known manner to yield the corresponding saturated acid. The acid is then esterified by acid-catalyzed reaction with propargyl alcohol, and the resulting ester is isolated by conventional methods.

The propargyl esters of this invention are characterized by good bactericidal and fungicidal activity coupled with relatively low mammalian toxicity. They also are only moderately volatile, and can be employed as contact biocides or as biocidal additives to formulations in which persistence of the biocide is desired. For example, they may be incorporated into paints, especially latex paints, or other protective coating formulations to protect the coating against bacterial or fungal attack.

The particular amounts of the compounds necessary to provide protection against bacteria and/or fungi obviously will depend upon the particular environment or locus to be protected. These amounts are generally similar to those employed with bactericidal or fungicidal compounds of comparable activity, or are readily determined by simple tests, and thus form no part of the present invention.

EXAMPLE 1

Five hundred forty grams of acrylic acid and 330 grams of dicyclopentadiene were heated at 160° C. for 16 hours in a pressure reaction vessel. The resultant viscous liquid was distilled at reduced pressure to yield 337 grams of bicyclo[2.2.1]hept-5-ene-2-carboxylic acid boiling at 93–97° C., and 3 mm. Hg.

*Analysis.*—Calculated (percent): C, 69.6; H, 7.2. Found (percent): C, 69.4; H, 7.3.

Sixty grams of the thus-produced acid, 73.5 grams of propargyl alcohol, 300 milliliters of benzene and 4.1 grams of concentrated sulfuric acid were stirred and refluxed under an azeotrope head until 7.8 milliliters of water had collected in the head. The reaction mixture was cooled, washed several times with sodium carbonate solution and finally with water. After drying the organic portion over magnesium sulfate, filtering and removing the solvent under reduced pressure, the residue was fractionated at reduced pressure to yield 14.2 grams of propargyl bicyclo[2.2.1]hept-5-ene-2-carboxylate boiling at 72–80° C. and 0.7 mm. Hg. This product was 88 percent pure as shown by vapor phase chromatography.

*Analysis.*—Calculated (percent): C, 69.6; H, 7.2. Found (percent): C, 73.8; H, 7.3.

EXAMPLE 2

Employing similar procedures, 3-methylbicyclo[2.2.1]hept-5-ene-2-carboxylic acid was prepared from crotonic acid and dicyclopentadiene and esterified with propargyl alcohol. Propargyl 3-methylbicyclo[2.2.1]hept-5-ene-2-carboxylate was recovered in 35.2 percent yield and 86.4 percent purity as a fraction boiling at 69–76° C. and 0.7 mm. Hg.

*Analysis.*—Calculated (percent): C, 75.8; H, 7.4. Found (percent): C, 74.9; H, 7.8.

EXAMPLE 3

Employing procedures similar to those described in Example 1, 60 grams of bicyclo[2.2.1]heptane-2-carboxylic acid (obtained by reaction of dicyclopentadiene with acrylic acid followed by hydrogenation employing palladium on carbon as catalyst) was esterified with 75 grams of propargyl alcohol to yield 60.2 grams of propargyl bicyclo[2.2.1]heptane-2-carboxylate in 98.1 percent purity as a fraction boiling at 104–106° C. and 7 mm. Hg.

*Analysis.*—Calculated (percent): C, 74.1; H, 7.9. Found (percent): C, 74.0; H, 8.1.

EXAMPLE 4

Employing procedures similar to those described in Example 1, 30 grams of 1-(or 6-)methylbicyclo[2.2.1]heptane-2-carboxylic acid (obtained by reaction of methylcyclopentadiene with acrylic acid followed by hydrogenation over palladium on carbon catalyst) was reacted with 33.6 grams of propargyl alcohol to yield 21.1 grams of propargyl 1-(or 6-)methylbicyclo[2.2.1]heptane-2-carboxylate as a fraction boiling at 113–123° C. at 7 mm. Hg.

*Analysis.*—Calculated (percent): C, 75.0; H, 8.3. Found (percent): C, 72.7; H, 8.4.

Each of the products of Examples 1–4 was tested for bactericidal activity. For each compound, a dilution series of 0.487, 0.975, 1.95, 3.90, 7.81, 15.62, 31.25, 62.5, 125, 250 and 1000 μg./cc. of the test compound in Brain Heart Infusion Broth was prepared. Each sample was admixed in a test tube with an equal volume of a 24-hour diluted broth culture of the test organism and then incubated at 37° C. for 18 hours and examined for growth. The minimum concentration, in μg./cc., at which no growth was observed is set forth in Table A.

TABLE A

Minimum Concentration for No Bacterial Growth

| Organism | Compound of Example— | | | |
|---|---|---|---|---|
|  | 1 | 2 | 3 | 4 |
| Staphyloccocus aureus | 1.95 | 0.487 | 0.487 | 0.487 |
| Salmonella typhimurium | 3.90 | 3.90 | 3.90 | 125 |
| Pseudomona aeruginosa | 0.915 | 1.95 | 3.90 | 31.25 |
| Proteus vulgaris | 0.487 | 1.95 | 3.90 | 125 |
| Escherichia coli | 3.90 | 3.90 | 3.90 | 125 |

The propargyl 1-(or 6-)methylbicyclo[2.2.1]heptane-2-carboxylate of Example 4 was evaluated for fungicidal activity against *Rhizopus nigricans*, Aspergillus sp., *Mucor genevensis* and *Penicillium* sp. For each species of fungus, a quartered Petri dish is prepared by pouring Sabouraud's Dextrose agar into quadrants #2 and #4 and agar plus the test compound into quadrants #1 and #3. In the first test, the test compound is present at a concentration of 0.5 percent in quadrant #1 and 0.25 percent in quadrant #3. The test is repeated at lower concentrations until fungus growth is observed in quadrant #3 after seven days. Inhibition of Rhizopus, aspergillus and Penicillin were observed between 0.03 and 0.06 percent, and of Mucor between 0.06 and 0.12 percent.

What is claimed is:

1. A compound selected from those having the formulas:

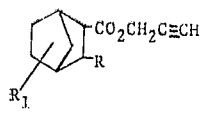

and

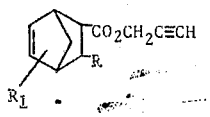

wherein R is hydrogen or methyl, $R_1$ is hydrogen or methyl and wherein R is hydrogen when $R_1$ is methyl and $R_1$ is hydrogen when R is methyl.

2. A compound in accordance with claim 1 having the formula:

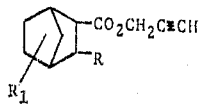

wherein R is hydrogen or methyl, $R_1$ is hydrogen or methyl and wherein R is hydrogen when $R_1$ is methyl and $R_1$ is hydrogen when R is methyl.

3. A compound in accordance with claim 1 having the formula:

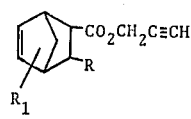

wherein R is hydrogen or methyl, $R_1$ is hydrogen or methyl and wherein R is hydrogen when $R_1$ is methyl and $R_1$ is hydrogen when R is methyl.

4. A compound in accordance with claim 1 having the formula

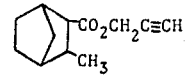

5. A compound in accordance with claim 1 having the formula:

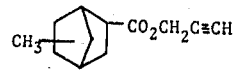

6. A compound in accordance with claim 1 having the formula

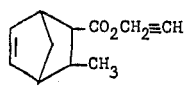

7. A compound in accordance with claim 1 having the formula:

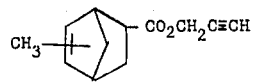

8. A compound in accordance with claim 1 wherein said compound is propargyl bicyclo[2.2.1]hept-5-ene-2-carboxylate.

9. A compound in accordance with claim 1 wherein said compound is propargyl bicyclo[2.2.1]heptane-2-carboxylate.

References Cited

UNITED STATES PATENTS 3,164,573  1/1965  Schweiken _____ 260—78.5
3,405,110  10/1968  Hecht et al. _____ 260—91.3

LORRAINE A. WEINBERGER, Primary Examiner

R. GERSTL, Assistant Examiner

U.S. Cl. X.R.

106—15; 260—29.2 R; 424—299